United States Patent [19]

Ohashi et al.

[11] Patent Number: 5,314,291
[45] Date of Patent: May 24, 1994

[54] LOAD BALANCER

[75] Inventors: Hirotaka Ohashi; Toru Yasunobe, both of Tokyo, Japan

[73] Assignee: Mitsui Engineering & Shipbuilding Co., Ltd., Tokyo, Japan

[21] Appl. No.: 942,885

[22] Filed: Sep. 10, 1992

[30] Foreign Application Priority Data

Sep. 24, 1991 [JP] Japan ................................. 3-243425
Nov. 20, 1991 [JP] Japan ................................. 3-304752

[51] Int. Cl.⁵ ................................................ B66F 9/06
[52] U.S. Cl. ..................................... 414/719; 414/917
[58] Field of Search ........................ 414/680, 719, 917

[56] References Cited

U.S. PATENT DOCUMENTS 4,699,560 10/1987 Ostermeyer et al. ............ 414/917 X
5,163,537 11/1992 Radev ............................ 414/917 X
5,192,179 3/1993 Kovacs ........................... 414/917 X

FOREIGN PATENT DOCUMENTS

61-197079 12/1986 Japan.

*Primary Examiner*—Michael S. Huppert
*Assistant Examiner*—Donald W. Underwood
*Attorney, Agent, or Firm*—Nikaido Marmelstein, Murray & Oram

[57] ABSTRACT

A load balancer adapted to set the load of an article to substantially zero by utilizing an air pressure, and provided with a balance cylinder unit consisting of air brakes, a balance cylinder and a weight sensing cylinder. This balance cylinder unit is formed by arranging the balance cylinder and weight sensing cylinder on the same axis, and air brakes on both sides of the balance cylinder.

3 Claims, 5 Drawing Sheets

LOAD BALANCER

BACKGROUND OF THE INVENTION

This invention relates to a load balancer capable of transferring articles easily, and more particularly to a load balancer adapted to set the load of articles to substantially zero by utilizing an air pressure.

A known load balancer of this kind is disclosed in, for example, Japanese utility model application Kokai publication No. 61-197079. In this conventional example, an air brake cylinder provided in series with respect to a balance cylinder is operated to control a piston rod of the balance cylinder unitarily with the balance cylinder, and the load of articles, which is transmitted from an article support arm, is transmitted to a weight sensing cylinder provided in series just as the balance cylinder, to generate a reference pressure corresponding to the load. The compressed air the pressure of which corresponds to the reference pressure is supplied to a chamber in the balance cylinder. When the air brake is then released, this compressed air causes a reaction force corresponding to the load to be generated, which is applied to the support arm via the piston and piston rod of the balance cylinder to set the load of the articles held on the support arm to substantially zero. This enables the articles to be treated and transferred easily by human power.

However, in order to make the air brake, which is provided in series with respect to the balance cylinder, fix the piston rod of the balance cylinder when the load of the articles is transmitted to the weight sensing cylinder to set a reference pressure, the necessity of setting the axial length of the air brake considerably large occurs. Therefore, the axial length of a balance unit consisting of the weight sensing cylinder, balance cylinder and air brake is necessarily set large. Accordingly, the height of the load balancer necessarily becomes large, so that it becomes unsuitable to use the load balancer, for example, inside a building or under a construction machine and an aircraft.

SUMMARY OF THE INVENTION

An object of the present invention is to provide a load balancer having a small height and capable of being used even inside a building or under a construction machine and an aircraft.

In the load balancer according to the present invention which is capable of attaining this object, a piston rod of a balance cylinder is connected pivotally to one portion of a horizontal pin joined pivotally to an arm, and brake rods of air brakes to the portions of the horizontal pin which are on both sides of the piston rod-connected portion thereof. These brake rods are passed through air brake cylinders fixed to the balance cylinder which is secured to a balance frame, and the piston rod of the balance cylinder is passed freely through the balance frame, the lower portion of the balance cylinder forming a piston of a weight sensing cylinder.

When the air brakes control the brake rods in this structure, the load of articles is transmitted to the brake rods, balance frame and balance cylinder in the mentioned order via the pin connected pivotally to the arm, and finally to the weight sensing cylinder to generate a load balancing reference pressure. Since the air brakes are fixed to the portions of the balance frame which are on both sdies of the balance cylinder, the load is transmitted in a branching manner from the brake rods to the balance frame. Therefore, the air brakes can be miniaturized, i.e., it becomes possible to increase the diameter of the brake rods and reduce the length of the air brake cylinders, it also becoming possible to control the piston rod satisfactorily even when a large load is imparted thereto. Accordingly, the axial length of the air brakes can be reduced, i.e., it can be set correspondingly to the length of the balance cylinder and the length of the weight sensing cylinder.

The object of the present invention can also be achieved by a load balancer formed by connecting a weight sensing cylinder pivotally and horizontally to a chassis of a vehicle, disposing a balance cylinder in series with respect to the weight sensing cylinder, pivotally connecting a piston rod of this balance cylinder to a downwardly extending arm of an L-shaped lever arm which is connected pivotally and horizontally at its intermediate portion to a vertical frame, pivotally connecting one end of a push rod to the other arm of the L-shaped lever arm, pivotally connecting the other end of this push rod to one support arm of a parallel link mechanism consisting of two support arms one end of each of which is connected pivotally to vertically spaced portions of the chassis frame, and pivotally and horizontally connecting the other ends of the support arms to a yoke provided with a load supporting adapter.

The object of the present invention can also be achieved by a load balancer formed by horizontally disposing a weight sensing cylinder on the portion of a chassis provided with a pair of driving wheels and a pair of steerable wheels which is in the vicinity of rear wheels out of these wheels and the longitudinal center line of the chassis and pivotally connecting a rear support end of the weight sensing cylinder thereto, disposing an air brake-carrying balance cylinder in series with respect to the weight sensing cylinder, pivotally connecting a piston rod of this balance cylinder to a downwardly extending arm of an L-shaped link connected pivotally at its intermediate portion to a vertical frame, pivotally connecting one end of a push rod to the other arm of the L-shaped link, pivotally connecting the other end of the push rod to one arm of a parallel link mechanism consisting of two support arms one end of each of which is connected pivotally to vertically spaced portions of the vertical frame, pivotally connecting the other ends of the support arms to a load supporting adapter via a yoke, disposing an engine, which is adapted to drive the driving wheels and generate an air pressure to be supplied to the balance cylinder, on the portion of the chassis which is laterally away from the longitudinal center line thereof, and disposing an air tank and an oil tank on the portion of the chassis which is laterally away from the longitudinal center line of the chassis with the parallel link mechanism positioned between the engine and these tanks.

In the load balancers thus formed, the weight sensing cylinder and the air brake-carrying balance cylinder unit are disposed horizontally with respect to a vehicle, and the piston rod of the balance cylinder is connected pivotally to a support arm of a parallel link mechanism which is adapted to support a load via the L-shaped link. Accordingly, the height of the load balancer as a whole can be reduced sufficiently in accordance with the purpose of using the load balancer and correspondingly to the diameter of the balance cylinder unit. Also, even when the length of the arm, which is connected pivotally to the support arm-engaged push rod, of the L-shaped link, is reduced, the diameter of the balance cylinder can be increased. Consequently, even when the stroke width of the piston of the balance cylinder is reduced, the angle of vertical movement of the load supporting arms can be set to a sufficiently high level.

DESCRIPTION OF THE PREFERRED EMBODIMENTS

The embodiments of the load balancer according to the present invention will now be described with reference to the drawings.

Figure 1:
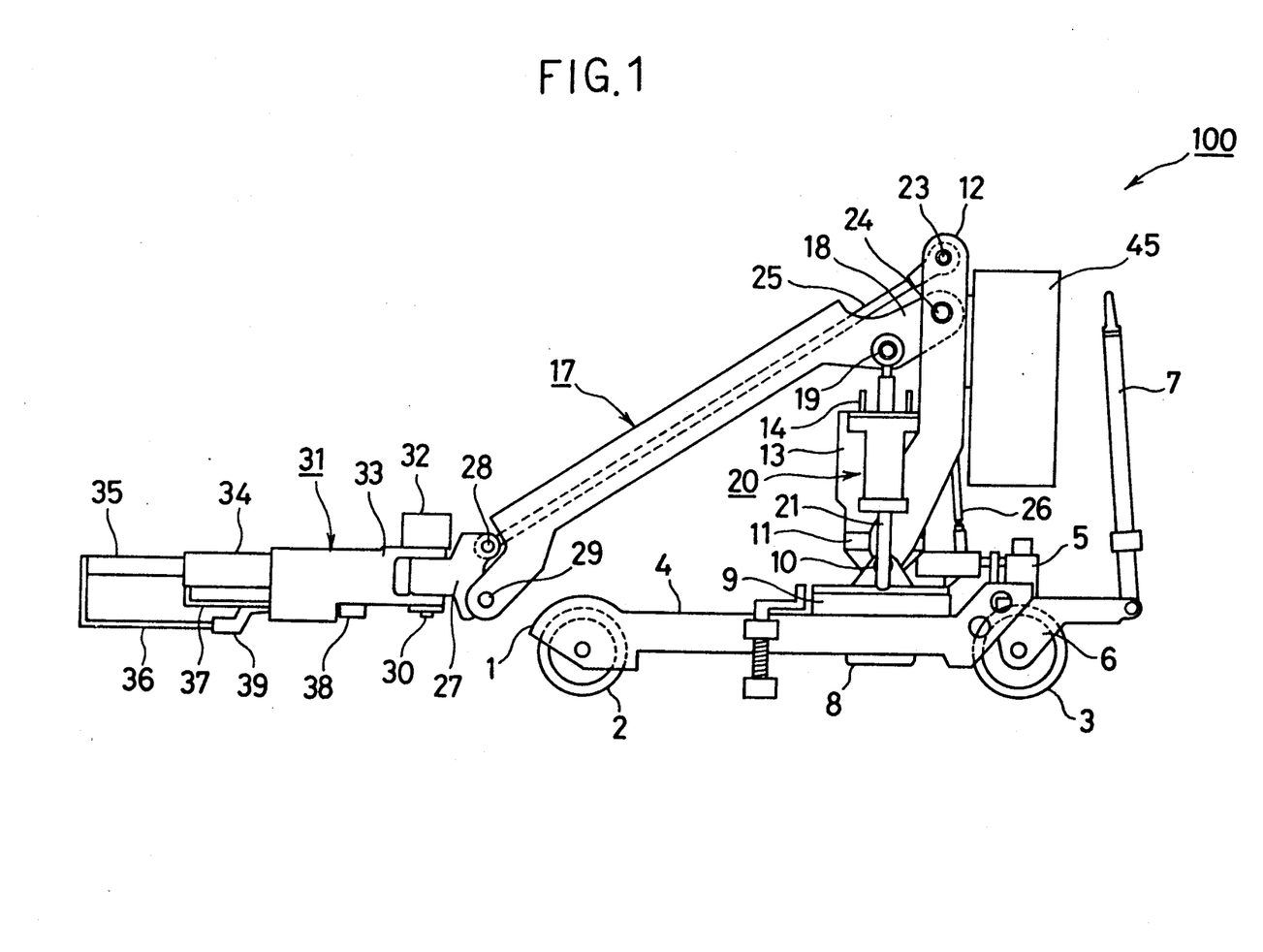
FIG. 1 is a side elevation of an embodiment of the load balancer according to the present invention.

As shown in FIG. 1, the load balancer according to the present invention includes an undercarriage 1 which consists of a chassis frame 4 supported on three wheels 2, 3. Out of the wheels 2, 3, the paired wheels 2 are supported vertically on the chassis frame 4 via bearings, and the remaining single rear wheel 3 on a steering frame 6 via a bearing, which steering frame 6 is supported via a bearing so that it can be turned around a vertical shaft 5 with respect to the chassis frame 4. A steering arm 7 is connected pivotally to the steering frame 6 so that the steering arm 7 can be vertically moved.

Figure 2:
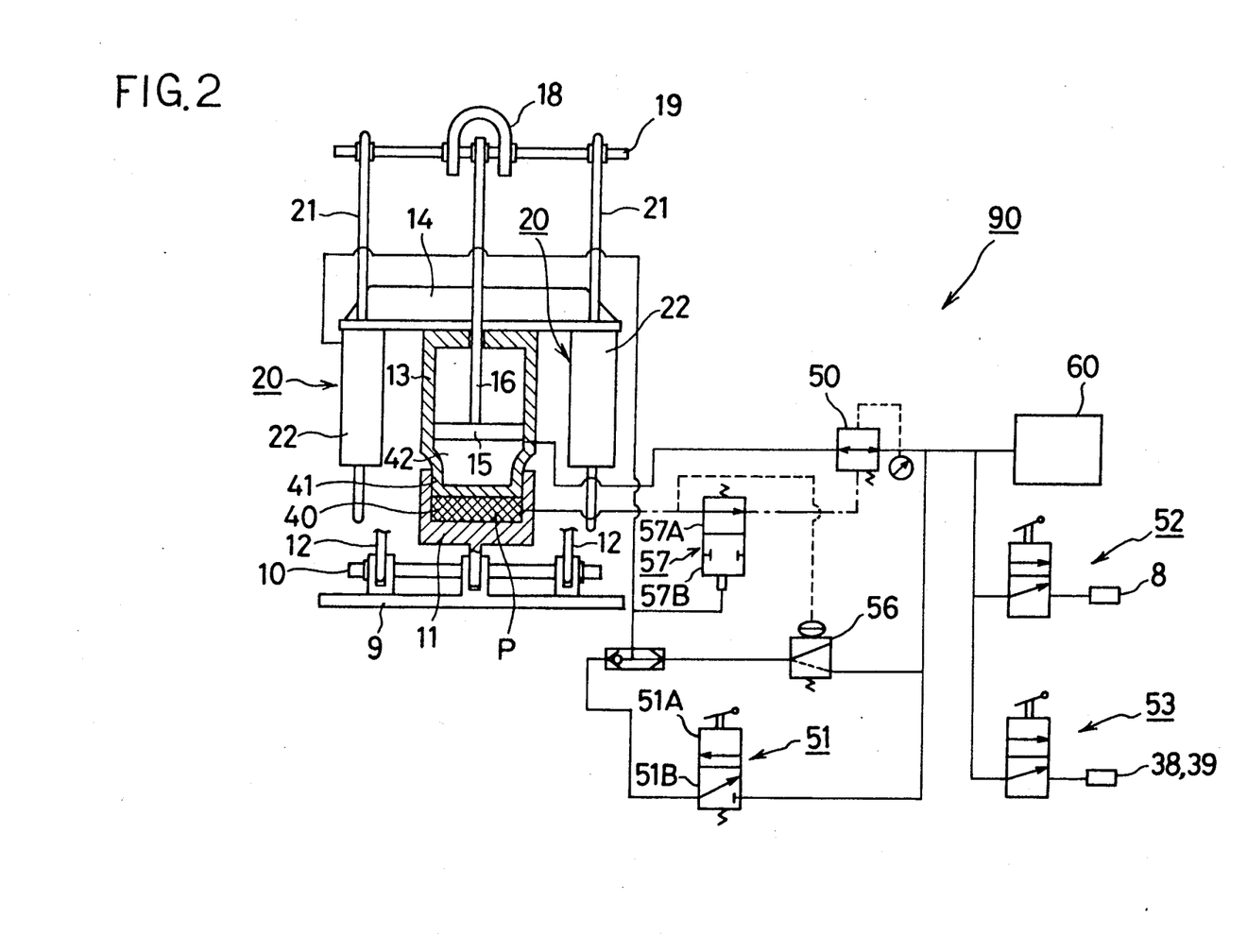
FIG. 2 is a block diagram of a control circuit for the load balancer shown in FIG. 1.

A turntable 9 is placed on the portion of the chassis frame 4 which is close to the steering frame 6 so that the turntable 9 can be turned around a vertical shaft via a swing bearing 8 provided on the chassis frame 4. A horizontally extending pin 10 is provided on this turntable 9. As shown in FIG. 2, a weight sensing cylinder 11 which will be described later is connected pivotally to the intermediate portion of the pin 10. Swing arms 12 are connected pivotally to the portions of the pin 10 which are on both sides of and equally away from the weight sensing cylinder 11. A balance cylinder 13 is fitted slidably in the weight sensing cylinder 11, and fixed at the upper end thereof to a balance frame 14. A piston rod 16 fixed to a balance piston 15 provided in the balance cylinder 13 projects upward through a bore provided in the balance frame 14, and is joined pivotally at its upper end to a lower arm 18 of a rhomboidal link 17 via a pin 19 which is parallel to the pin 10 provided on the turntable 9. Brake rods 21 of air brakes 20 are connected pivotally to the portions of the pin 19 which are on both sides of and equally away form the piston rod-connecting point thereon and they are passed through air brake cylinders 22 and fixed to the balance frame 14. Each of these air brakes 20 consists of a known air brake adapted to release the brake rod 21 when it receives compressed air, and control the brake rod by the force of a spring when the supplying of the compressed air thereto is stopped.

Each of the swing arms 12 connected pivotally to the horizontal pin 10 provided on the turntable 9 is shaped so as to extend first diagonally rearward from the pin 10, and then perpendicularly upward, and upper and lower arms 25, 18 of the rhomboidal link 17 are connected pivotally to the portions of the swing arm 12 which are in the vicinity of the upper ends thereof via two pivot pins 23, 24 which constitute a shorter side of the same link 17. These pivot pins 23, 24 are parallel to the horizontal pin 10 on the turntable 9 and the pin 19 via which the piston rod 16 and lower arm 18 are pivotally connected, and they are positioned on substantially the same vertical plane. A rod 26 is connected pivotally at one end thereof to the lower pivot pin 24, and at the other end thereof to the turntable 9, whereby the rod 26 draws the swing arm 12 via the lower pin 24 so that the swing arm 12 is not turned due to a load around the horizontal pin 10 provided on the turntable 9.

A support frame 27 is connected pivotally to the front ends of the upper and lower arms 25, 18 of the rhomboidal link via horizontal pins 28, 29. The points at which the support frame 27 and the upper and lower arms 25, 18 are pivotally connected are in the same vertical plane, and the distance between these points of pivotal connection of the arms 25, 18 is equal to that of the points of pivotal connection thereof to the swing arm 12. Accordingly, the upper and lower arms 25, 18, swing arm 12 and support frame 27 form the rhomboidal link 17.

A vertical shaft 30 is fixed to the front portion of the support frame 27, and a slide arm 31 capable of turning in the horizontal direction to this vertical shaft 30. The slide arm 31 is provided with an air brake 32, which consists of a known air brake capable of working on the vertical shaft 30. The air brake is adapted to set the slide arm 31 freely swingable when it receives the supply of compressed air, and hold the vertical shaft by the force of a spring and display its control force when the supply of compressed air is stopped.

The slide arm 31 consists of three cross-sectionally rectangular telescopically extensible arms, i.e. first, second and third arms 33, 34, 35. Arm braking rods 36, 37 are fixed to the front ends of the lower portions of the second and third arms 34, 35 so as to extend in parallel with the extending and contacting direction thereof. These arms 34, 35 are passed through the air brakes 38, 39 provided on the first arm 33. The air brakes 38, 39 are adapted to control the movements of the rods 36, 37 when they receive the supply of compressed air, and determined the length of extension of the slide arms 34, 35. The slide arm 31 is provided at the front end thereof with an article support member or an article holding member (not shown).

The balance cylinder 13 will now be described in detail. As shown in FIG. 2, an incompressible fluid 40 is held in a cylinder body of the weight sensing cylinder 11 connected pivotably to the horizontal pin 10 provided on the turntable 9, and the lower portion of the balance cylinder 13 forms a piston 41, which is fitted in the weight sensing cylinder 11 so as to enclose the incompressible fluid. A balance piston 15 is fitted slidably in the balance cylinder 13 and receives a predetermined level of air pressure in a cylinder chamber 42 to support the lower arm 18 of the rhomboidal link at the point of pivotal connection thereof to the piston rod 16 via the same piston rod 16. The controlling of the pressure of the air supplied to the chamber 42 of the balance cylinder 13 will be described later. The piston 41 consisting of the lower portion of the balance cylinder 42 has the same diameter as the balance piston 15. A control board 45 is provided at the back of the swing arms 12 so as to control a load balancer 100 (refer to FIG. 1).

The operation of the load balancer 100 according to the present invention will now be described in connection with a control circuit therefor. As shown in FIG. 1, the load of an article placed on the front end portion of the slide arm 31 is imparted to the piston rod 16 of the balance cylinder 13 via the lower arm 18 of the rhomboidal link 17. When the supply of compressed air to the air brake 20 is stopped, the brake cylinder 22 controls the brake rod 21. Consequently, the load is transmitted to the balance cylinder 13 via the balance frame 14, and the piston 41 at the lower portion of the balance cylinder 13 presses the incompressible fluid 40 in the weight sensing cylinder 11 to generate a reference pressure P corresponding to the load of the article. This reference pressure P is transmitted to a precision reducing valve 50, and the compressed air supplied to the precision reducing valve 50 is regulated to a pressure corresponding to the reference pressure P, the pressure-regulated air being supplied from a compressed air source 60 to the interior of the chamber 42 of the balance cylinder 13. Thus, the balance cylinder 13 constantly receives a reaction force corresponding to the load of the article, which is placed on the front end portion of the slide arm 33, via the rhomboidal link 17, support frame 27 and slide arm 31, so that the article can be maintained substantially weightless.

The controlling of the load balancer 100 according to the present invention shown with a control circuit 90 will now be described. When a manual selector valve 51 is switched from a position 51A to a position 51B, the compressed air in the air brakes 20 fixed to the balance frame 14 controls the rods 21 with respect to the balance frame 14 due to the force of a spring.

When an article is then placed on the front end portion of the slide arm 33, the load of the article presses the incompressible fluid 40 in the weight sensing cylinder 11 via the lower arm 18 of the rhomboidal link, pink 19, air brakes 20, balance frame 14 and balance cylinder 13 to generate therein a reference pressure P for the air to be supplied to the balance cylinder 13. This reference pressure P is transmitted to a precision reducing valve 50, which correspondingly controls the pressure of the air supplied from a compressed air source 60 to the balance cylinder 13. When the manual selector valve 51 is then operated to supply the compressed air from the compressed air source 60 to the air brakes 20, the air brakes 20 release the piston rods 21. Also, compressed air the pressure of which corresponds to the load of the article is supplied from the precision reducing valve 50 to the balance cylinder 13, and this compressed air supports the lower arm 18 of the rhomboidal link through the piston 15 and piston rod 16 of the balance cylinder 13. An automatic selector valve 57 receives the air pressure at this time to be switched from a position 57A to a position 57B, whereby the reference pressure P from the weight sensing cylinder 11 is shut off. Accordingly, this reference pressure P is constantly applied to the precision reducing valve 50. Thus, the article placed on the front end portion of the slide arm 33 together with the weight of the slide arm 33 becomes substantially weightless.

The manual valves 52, 53 are then operated to release or actuate a brake for the turntable 9 to set the rotary position in the horizontal direction of the arm 17, and the brakes 38, 39 engaged with the rods 36, 37 fixed to the slide arm 33, to determine the lengths of the slide arms 34, 35.

A safety control operation to be carried out when an overload occurs on a load support system, i.e., on the rhomboidal link 17, support frame 27 and slide arm 33 will now be described.

When a load, heavier than allowable, is imparted to the slide arm 33 in the load balancer 100 according to the present invention, the pressure in the weight sensing cylinder 11 exceeds an allowable level. When a control valve 56 constantly monitoring the pressure in the weight sensing cylinder 11 detects an excessive pressure, compressed air is sent from the compressed air source 60 to a circuit for the air brakes 20 to release the air brakes 20 and return the article to the ground surface so that the safety of the apparatus can be ensured.

A second embodiment of the present invention will now be described.

Figure 3:
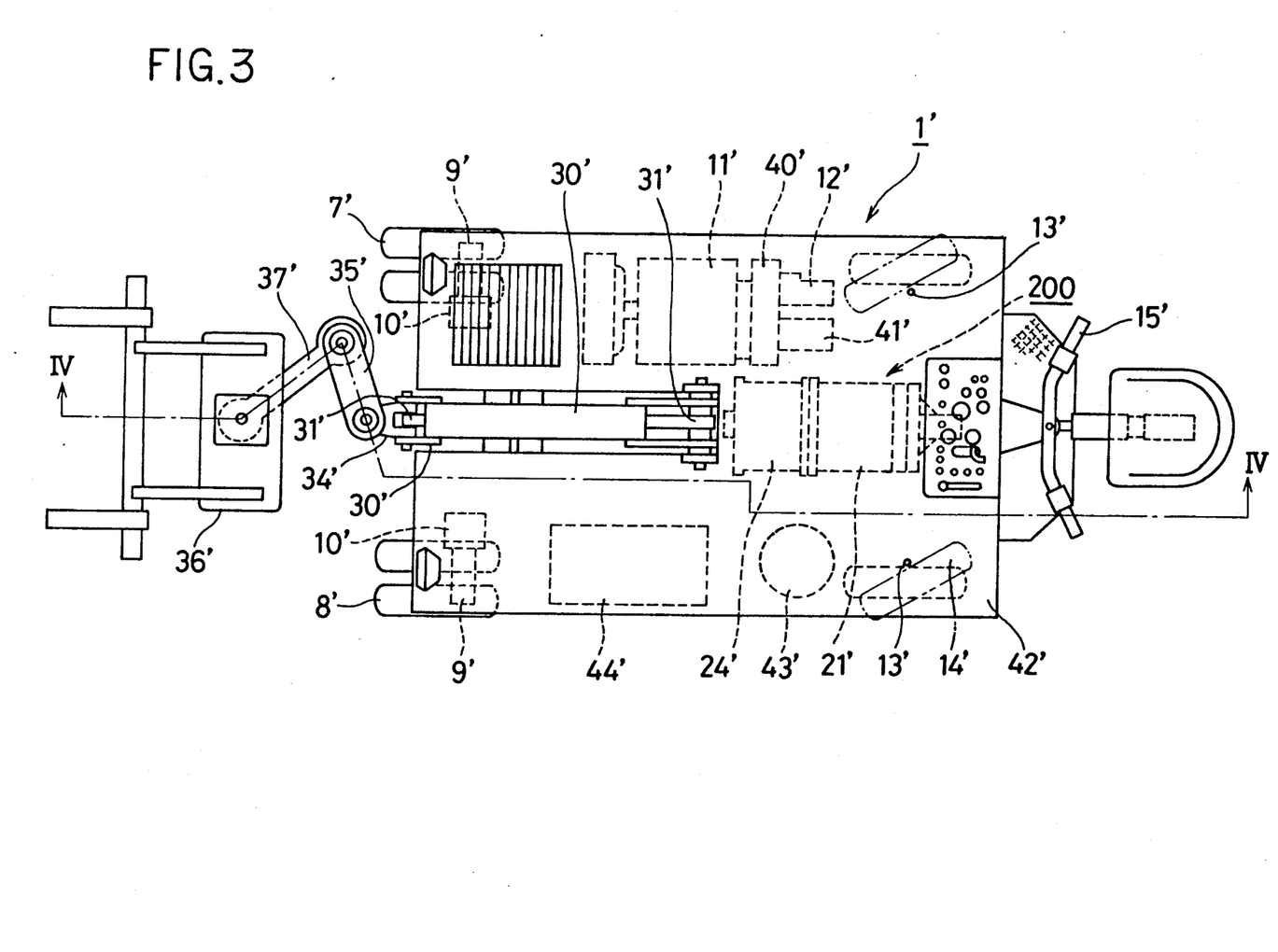
FIG. 3 is a plan view of another embodiment of the load balancer according ot the present invention.
Figure 4:
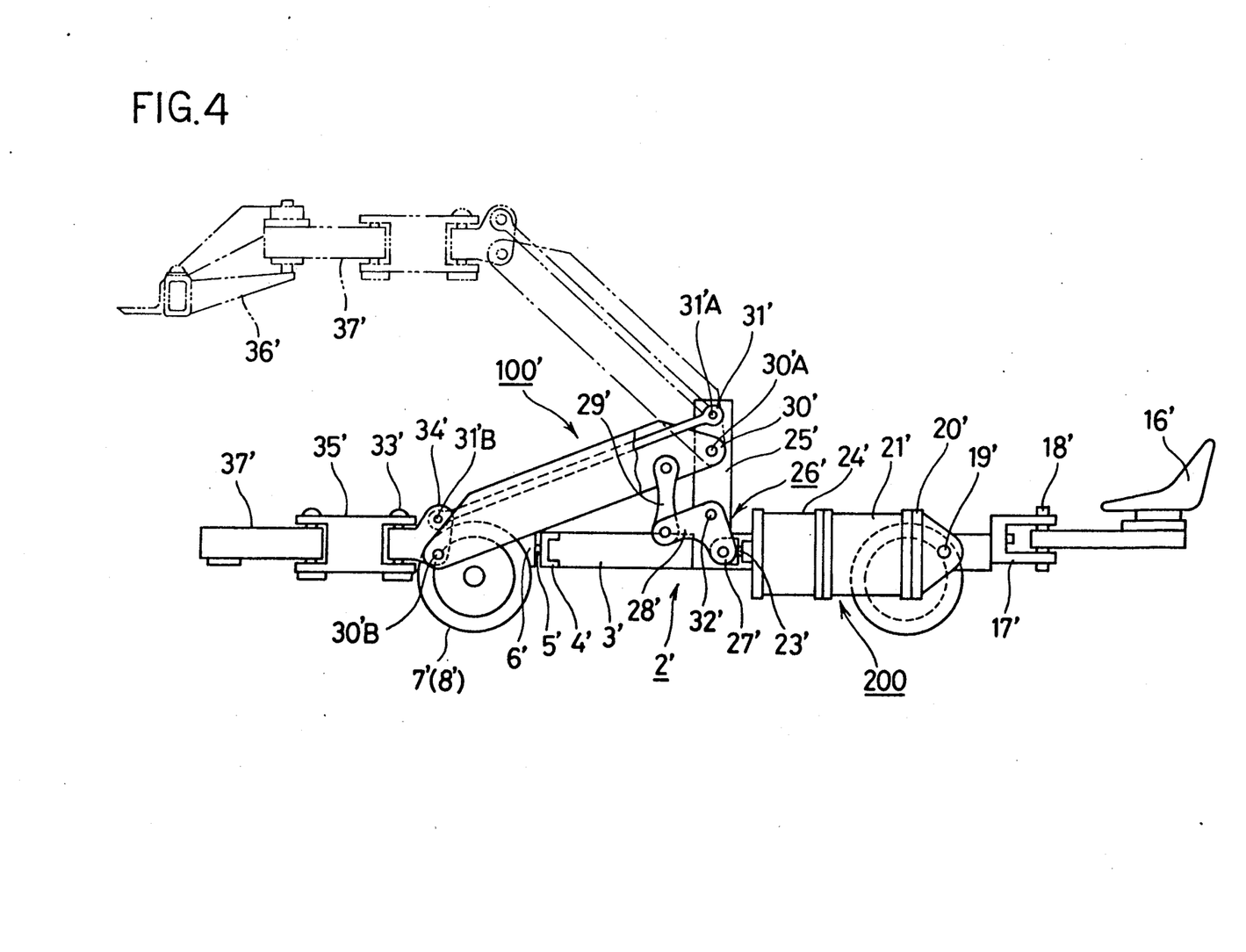
FIG. 4 is a sectioned side elevation taken along the line IV—IV in FIG. 3 and schematically showing, especially, a principal portion of the present invention.

A chassis 2' (which will hereinafter be referred to as a main frame 2') of a load balancer 1' according to the present invention shown in FIG. 3 consists of a pair of longitudinally extending frames 3' (only one of them is shown in FIG. 4) and a plurality of lateral frames 4' connecting these longitudinal frames 3' thereto in the lateral direction. The foremost lateral frame 4' in this main frame 2' includes a pin 5' projecting forward along the longitudinal center line of the main frame 2'. A lateral beam 6' is supported on this pin 5' via a bearing, and a pair of forwardly projecting arms (not shown) are fixed to both ends of this lateral beam 6', left and right wheels 7', 8' being supported on these arms via bearings. The bearing shaft of the wheels 7', 8' is driven by oil motors 9', which are provided on the main frame 2', via clutches 10' and chains. The range within which the lateral beam 6' supporting the driving wheels 7', 8' is turned around the pin 5' is limited by a stopper (not shown), so that a relative variable angle between the lateral beam 6', i.e. the wheels 7', 8', and main frame 2' is set to levels in a predetermined range. The wheels 7', 8' are provided with flat surfaced tires, and a front axle including the lateral beam 6' therefore forms a highly rigid suspension unit. The supplying of a working oil to the motors 9' is done by an oil pump 12' which is adapted to be driven by a small engine 11' provided on the right side of the longitudinal center line of the chassis as shown in FIG. 3, and, during this operation, the oil is supplied simultaneously to the oil motors 9' provided on the left and right wheels 7', 8'.

Pivots 13' capable of turning around the vertical axes thereof are provided on both side portions of the rearmost lateral frame 4' in the main frame 2', and maneuvering wheels 14' are supported via bearings on shaft pins projecting sideways from these pivots 13'. A maneuvering force from a drag link (not shown) connected to a handlebar 15' is transmitted to a steering link (not shown) connected at both ends thereof to levers (not shown) projecting laterally in a similar manner as mentioned manner from the left and right pivots 13'. Although this maneuvering mechanism has a known structure, it is important that a maneuvering angle of the handlebar 15' and that of the wheels be substantially in agreement with each other. As shown in FIG. 4, a yoke 17' for mounting a seat 16' thereon is fixed to the rearmost lateral frame 4' in the main frame 2', and the front end portion of the seat is supported on the yoke 17' so that the seat can be turned around a vertical shaft 18'. As shown in FIG. 4, the rear end portion of the weight sensing cylinder 20' forming a balance cylinder unit 200 is connected pivotally to the frame 4' via a pin 19' extending at right angles to the longitudinal center line of the chassis. A balance cylinder 21' is provided in series in front of the weight sensing cylinder 20'. A balance piston 22' is provided in the balance cylinder 21', and a piston rod 23' is joined to this piston 22', the piston rod 23' extending through an air brake 24', which is also provided in series with respect to the balance cylinder 21', to project outward. The air brake 24' consists of a known air brake which is adapted to separate a brake member from the piston rod 23' against the force of a spring when it receives compressed air thereon, and press the brake member by the force of the spring when the supply of the compressed air is stopped. The balance cylinder unit 200 consisting of the weight sensing cylinder 20', balance cylinder 21' and air brake 24' is disposed horizontally along the longitudinal frame 3' as shown in FIG. 4. The front end portion of the piston rod 23' is joined pivotally to an end portion of a downwardly extending arm 27', one of the arms of an L-shaped link 26' which is connected pivotally at its intermediate portion to a vertical frame 25' set up on the longitudinal frame 3'. One end portion of a push rod 29' is connected pivotally to the end portion of the other arm 28' of the L-shaped link 26'. One end portion of each of two support arms 30', 31' which form a parallel link mechanism is connected pivotally to the upper portion of the vertical frame 25'. The pivot pins 30'A, 31'A on the arms 30', 31' are on the same axis as the intermediate pivot pin 32' on the L-shaped link 26'. A push rod 29' is provided in parallel with this axis, and connected pivotally at the other end portion thereof to one support arm 30'. A yoke 34' supporting a support lever 35' so that the support lever 35' can be turned around a vertical shaft 33' is joined pivotally to the other end portions of the two support arms 30', 31', and the distance between the pivot pins 30'B, 31'B with respect to the yoke 34' and that between the pivot pins 30'A, 31'A via which the support arms 30', 31' are connected pivotally to the vertical frame 25', a line which connects the points of pivotal connection between the yoke 34' and support arms 30', 31' being positioned in parallel with that which connnects the points of pivotal connection between the support arms 30', 31' and vertical frame 25'. Another lever 37' supporting an article support adapter, for example, a fork 36' is connected to the front end portion of the support lever 35' so that the lever 37' can be turned around a vertical shaft.

Figure 5:
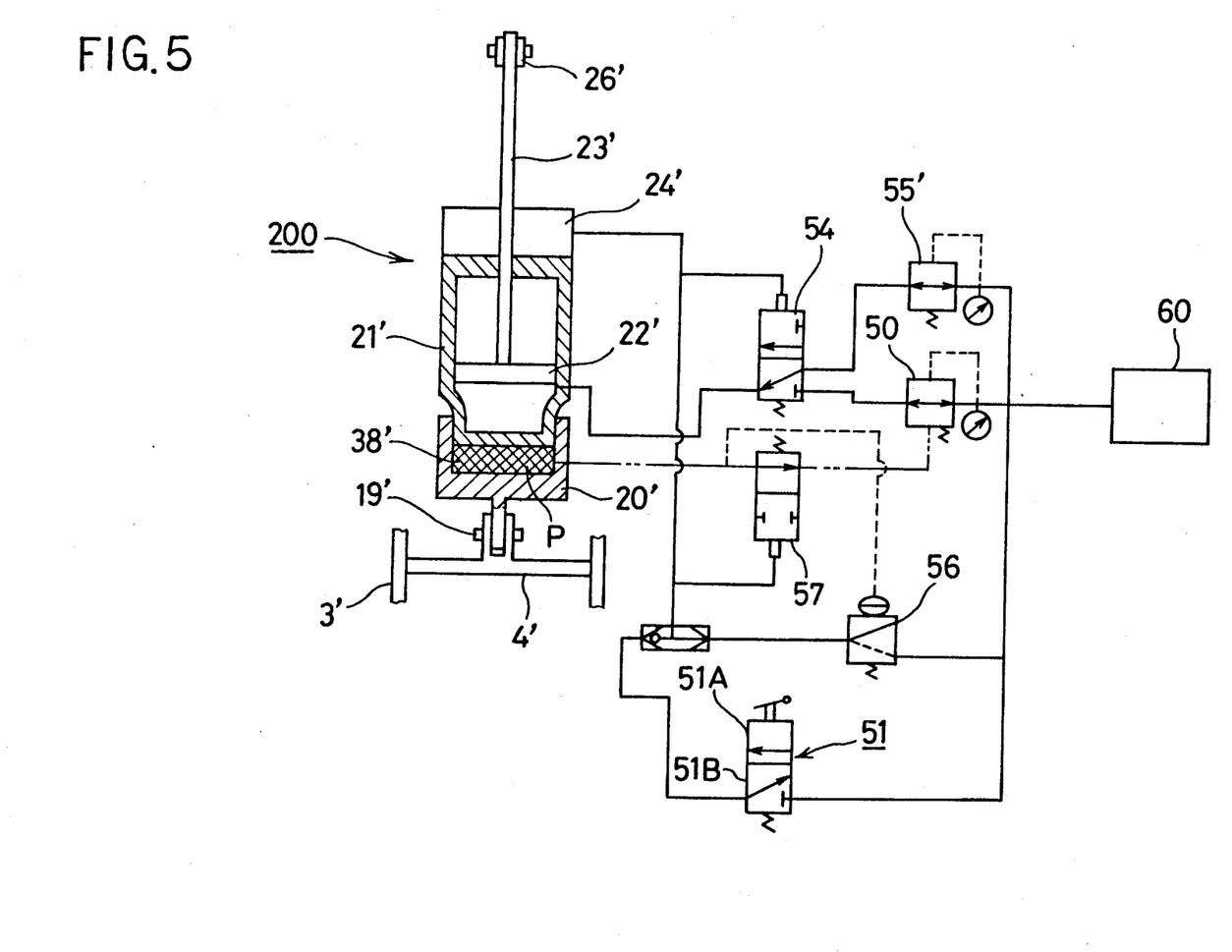
FIG. 5 is a block diagram of a control circuit for the load balancer of FIG. 3.

When an article is placed on the article support adapter 36', a load is imparted to the piston rod 23' of the balance cylinder 21' in the balance unit 200, which consists of the weight sensing cylinder 20', balance cylinder 21' and air brake 24' as shown in FIG. 5, via the two support arms 30', 31', push rod 29' and L-shaped link 26'. Since the manual selector valve 51 has been switched from the position 51A to the position 51B at this time, the air from the air brake 24' is shut off, and the piston rod 23' is restrained by the air brake 24'. Accordingly, the load of the article is transmitted from the piston rod 23' to the air brake 24' and balance cylinder 21'. The balance cylinder 21' presses a weight sensing medium 38' in the weight sensing cylinder 20', this medium being pressed between the balance cylinder 21' and weight sensing sylinder 20' to generate a reference pressure P corresponding to the load of the article. This reference pressure P is used to regulate the air pressure, which works on the balance piston 22' of the balance cylinder 21', in the precision reducing valve 50. Namely, the pressure of the liquid is supplied to the precision reducing valve 50 through an automatic selector valve 57, and the pressure of the air supplied from a compressed air source 60 to the balance cylinder 21' is regulated in this valve 50 to a level corresponding to the load. In order to precisely regulate the air pressure so that the pressure of the medium and the regulated air pressure becomes equal, the area of the pressure receiving surface of the balance piston and that of the medium may be set equal.

The compressed air source 60 for supplying compressed air to the balance cylinder 21' consists of the balance unit 200 provided in the vicinity of the longitudinal center line of the chassis, support arms 30', 31', parallel link mechanism 100' and miniaturized engine 11' provided at one side, and, especially, in front of the L-shaped link 26'. The balance unit 200 may be set aside from the longitudinal center line of the vehicle in the direction opposite to the small engine. As described previously, the small engine 11' is adapted to drive the oil pump 12' through a power distributing unit 40', and enables the supplying of a pressure oil to the driving wheels 7', 8'. It is also adapted to drive a compressor 41' to prepare compressed air to be supplied to the balance cylinder 21. The vehicle is provided with an oil reservoir 42' and an air tank 43' so that the balance unit 200 and parallel link mechanism 100' are positioned between these reservoir and tank and the small engine 11', and also an air pressure control valve unit and an air pressure control board 44' in front of the air tank 43'. The weight of the left and right portion of the chassis is balanced in this manner.

As mentioned previously, the yoke 17' is fixed to the rear portion of the main frame 2', and the seat 16' is supported on the yoke 17' so that the seat can be turned horizontally. When the seat 16' is moved near the vehicle, it can be turned by 90° around the vertical shaft 18.

The operation of this embodiment will now be described in detail.

First, when an article is placed on the fork 36', the load thereof is transmitted to the balance piston 22' via the support lever 35', yoke 34', parallel link mechanism 100', push rod 29' and L-shaped link 26'. Since the manual selector valve 51 has been switched to the position 51B at this time as shown in FIG. 5, the air is shut off therefrom, so that the air brake 24' holds the piston rod 23'. Consequently, the air brake 24' and balance cylinder 21' press the weight sensing medium 38' in the weight sensing cylinder 20', this medium being compressed between the weight sensing cylinder 20' and balance cylinder 21' to generate a reference pressure P corresponding to the load. At this time, the automatic selector valve 57 has been released from the air pressure and switched to a position for supplying the reference pressure P to the precision reducing valve 50. The reference pressure P is then supplied to the precision reducing valve 50 to precisely regulate the air pressure supplied to the interior of the balance cylinder 21'. The manual selector valve 51 is then switched to supply compressed air from the compressed air source 60 to the air brake 24' to release the piston rod 23' from the air brake 24'. At the same time, the automatic selector valve 57 shuts off the flow circuit of the reference pressure P and always supplies a constant pressure value not subjected to an external turbulance to the precision valve 50. Since the air pressure thus supplied to the interior of the balance cylinder 21' corresponds to the load of the article, the piston of the balance cylinder supports the article, which is placed on the fork 36', in a substantially weightless state. Accordingly, the article on the fork 36' can be dealt with easily by hand within the range of the vertical pivotal movements of the parallel link mechanism 100' and the range of the pivotal movements of the yoke 34' and support levers 35', 37'. When an overload is imparted to the balance cylinder 21', the control valve 56 constantly monitoring the pressure of the weight sensing medium 38' senses the overload and supplies the air into the air brake 24' and release the piston rod 23' so that the safety of the apparatus can be ensured.

An auxiliary reducing valve 55 has the function of regulating the air pressure supplied to the balance cylinder when the load balancer has no loads.

Since the balance cylinder, i.e. the weight sensing cylinder 20', balance cylinder 21' and air brake 24' are arranged in series and in parallel with the main frame 2', i.e., horizontally, the height of the load balancer can be set extremely small correspondingly to the diameter of the balance cylinder unit.

What is claimed is:

1. A load balancer comprising an undercarriage (1), a turntable (9) capable of turning around a vertical shaft owing to a swing bearing (8) provided on a chassis frame (4) of said undercarriage (1), a horizontal pin (10) provided on said turntable (9), a weight sensing cylinder (11) connected pivotally to an intermediate portion of said horizontal pin (10) and extending substantially upward, a balance cylinder (13) provided with a piston (41) fitted in said weight sensing cylinder (11), a balance frame (14) fixed to the upper end of said balance cylinder (13) with a piston rod (16) of a balance piston (15) of said balance cylinder (13) passed therethrough, air brake cylinders (22) fixed to said balance frame (14) and positioned at the same distance on opposite sides of said balance cylinder (13), a pin (19) connected at an intermediate portion thereof to said piston rod (16) via a shaft, connected at the portions thereof which are on both sides of and equally spaced from said piston rod-connected portion to a lower arm (18) of a rhomboidal link (17) via shafts and connected both end portions thereof via bearings to brake rods (21) passed through said air brake cylinders (22), swing arms (12) supported upright on said turntable (9) and connected to one end portion of each of an upper and said lower arms (25, 18) of said rhomboidal link (17), a support frame (27) connected at the portions thereof which are spaced at a distance equal to that between pivot pins (23, 24), via which said swing arms (12) and said upper and lower arms (25, 18) are connected together, to the other end portions of said upper and lower arms (25, 18), and an article support member (31) fitted around a vertical pin (30) fixed to said support frame (27).

2. A load balancer characterized in that a balance cylinder unit (200) is connected pivotally and horizontally to a chassis frame (2') of a vehicle, a piston rod (23') in said balance cylinder unit (200) being connected pivotally to a downwardly extending arm (27') of an L-shaped link (26') having two arms and connected pivotally at an intermediate portion thereof to a vertical frame (25') of said chassis (2'), a push rod (29') being connected pivotally at one end portion thereof to the other arm (28') of said L-shaped link (26'), the other end portion of said push rod (29') being connected pivotally to one support arm (30') of a parallel link mechanism (100') consisting of two support arms (30', 31') one end portion of each of which is connected pivotally to said vertical frame (25') of said chassis frame (2'), the other end portions of said support arms (30', 31') being connected pivotally to a yoke (34') provided with an article supporting adapter (36').

3. A load balancer characterized in that a weight sensing cylinder (20') in a balance cylinder unit (200) is connected pivotally and horizontally along a chassis (2'), which is provided with a pair of driving wheels (7', 8') and maneuvering wheels (14'), of a vehicle to the portion of said chassis (2') which is in the vicinity of said rear wheels (14'), a piston rod (23') in said balance cylinder unit (200) being connected pivotally to a downwardly extending arm (27') of an L-shaped link (26') having two arms and connected pivotally at an intermediate portion thereof to a frame (25') set up on said chassis (2'), a push rod (29') being connected pivotally at one end portion thereof to the other arm (28') of said L-shaped link (26'), the other end portion of said push rod (29') being connected pivotally to one support arm (30') in a parallel link mechanism 100' consisting of two support arms (30', 31') connected pivotally to said vertical frame (25'), the other end portions of said support arms (30', 31') being connected pivotally to a yoke (34') provided with an article supporting adapter (36'), an engine (11') adapted to generate energy for driving said driving wheels (7', 8') and supply working air to said balance cylinder unit (200) being disposed aside from the longitudinal center line of said vehicle, an air tank (43') and an oil tank (42') being disposed aside from said longitudinal center line so that said parallel link mechanism (100') is positioned between said engine (11') and said tanks (43', 42').

* * * * *